US011707168B2

(12) United States Patent
Bloom (10) Patent No.: US 11,707,168 B2
(45) Date of Patent: Jul. 25, 2023

(54) VACUUM CLEANER

(71) Applicant: TECHTRONIC CORDLESS GP, Anderson, SC (US)

(72) Inventor: Michael Bloom, Charlote, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 97 days.

(21) Appl. No.: 17/425,690

(22) PCT Filed: Jan. 31, 2020

(86) PCT No.: PCT/US2020/016157
§ 371 (c)(1),
(2) Date: Jul. 23, 2021

(87) PCT Pub. No.: WO2020/160436
PCT Pub. Date: Aug. 6, 2020

(65) Prior Publication Data
US 2022/0125254 A1 Apr. 28, 2022

Related U.S. Application Data

(60) Provisional application No. 62/799,846, filed on Feb. 1, 2019.

(51) Int. Cl.
*A47L 7/00* (2006.01)
*A47L 5/36* (2006.01)
(Continued)

(52) U.S. Cl.
CPC .............. *A47L 7/0019* (2013.01); *A47L 5/36* (2013.01); *A47L 9/0009* (2013.01); *A47L 9/22* (2013.01);
(Continued)

(58) Field of Classification Search
CPC ........ A47L 7/0019; A47L 5/36; A47L 9/0009; A47L 9/22; A47L 9/2884; H01M 10/46; H01M 50/244
See application file for complete search history.

(56) References Cited

U.S. PATENT DOCUMENTS 3,016,562 A * 1/1962 Reid .................. F16L 5/00
29/451
6,041,472 A * 3/2000 Kasen .................. B01F 25/105
15/355

(Continued)

FOREIGN PATENT DOCUMENTS

CA 2635621 A1 * 5/2009 .............. A47L 5/22
CN 106132264 A * 11/2016 ........... A47L 11/201
(Continued)

OTHER PUBLICATIONS

Chinese Patent Office Action for Application No. 202080011568.7 dated Jan. 21, 2022 (7 pages including statement of relevance).
(Continued)

*Primary Examiner* — Marc Carlson
(74) *Attorney, Agent, or Firm* — Michael Best & Friedrich LLP (57) ABSTRACT

A vacuum cleaner including a motor, a suction opening, an exhaust opening, and an air passageway in fluid communication with the suction source and the exhaust opening. The motor receives power from a power cord that enters the lower portion of the main body through a power cord opening. The main body also includes a drain opening, configured to allow egress of any liquid in the main body. The power cord opening is higher than the drain opening.

(Continued)

The vacuum also includes a protective tubular frame that surrounds the battery. The tubular frame is energy-absorbing, and is removable and replaceable.

27 Claims, 5 Drawing Sheets

(51) Int. Cl.
  *A47L 9/22* (2006.01)
  *A47L 9/28* (2006.01)
  *A47L 9/00* (2006.01)
  *H01M 10/46* (2006.01)
  *H01M 50/244* (2021.01)

(52) U.S. Cl.
  CPC ........... *A47L 9/2884* (2013.01); *H01M 10/46* (2013.01); *H01M 50/244* (2021.01)

(56) References Cited

U.S. PATENT DOCUMENTS

| | | | | |
|---|---|---|---|---|
| 6,119,304 | A * | 9/2000 | Berfield | A47L 5/22 |
| | | | | 15/352 |
| 10,383,493 | B2 | 8/2019 | Tahara | |
| 2005/0132526 | A1* | 6/2005 | Holsten | A47L 7/0038 |
| | | | | 15/353 |
| 2005/0155177 | A1* | 7/2005 | Baer | A47L 9/2873 |
| | | | | 15/353 |
| 2012/0233805 | A1* | 9/2012 | Williams | A47L 9/00 |
| | | | | 15/326 |
| 2014/0373306 | A1* | 12/2014 | Tomasiak | A47L 9/127 |
| | | | | 29/402.04 |
| 2015/0342432 | A1* | 12/2015 | Blackwell, Jr. | A47L 7/0004 |
| | | | | 55/361 |
| 2017/0095129 | A1* | 4/2017 | Richter | A47L 11/201 |

FOREIGN PATENT DOCUMENTS

| | | | | | |
|---|---|---|---|---|---|
| CN | 106132264 | A | | 11/2016 | |
| CN | 106583330 | A | * | 4/2017 | |
| CN | 106583330 | A | | 4/2017 | |
| CN | 107616754 | A | * | 1/2018 | |
| CN | 107616754 | A | | 1/2018 | |
| CN | 207306610 | U | * | 5/2018 | |
| CN | 207306610 | U | | 5/2018 | |
| EP | 2474260 | A2 | * | 7/2012 | ............. A47L 5/362 |
| EP | 3389464 | B1 | | 6/2019 | |
| GB | 2405787 | A | * | 3/2005 | ............... A47L 5/14 |
| JP | 2002095617 | A | * | 4/2002 | |
| JP | 2002095617 | A | | 4/2002 | |
| WO | WO-2012159124 | A1 | * | 11/2012 | ............... A47L 5/22 |
| WO | WO-2016170431 | A1 | * | 10/2016 | ............. A47L 5/225 |

OTHER PUBLICATIONS

International Search Report and Written Opinion for Application No. PCT/US2020/016157 dated May 4, 2020 (14 pages).

Examination Report No. 1 issued by the Australian Government for Application No. 2020214851 dated Jul. 8, 2022 ( 6 pages).

* cited by examiner

VACUUM CLEANER

CROSS-REFERENCE TO RELATED APPLICATIONS

This application claims priority to U.S. Provisional Patent Application No. 62/799,846, filed Feb. 1, 2019, the entire contents of which are hereby incorporated by reference herein.

BACKGROUND

The present invention relates to vacuum cleaners, such as upright vacuum cleaners, stick vacuums, canister vacuums, backpack vacuums, and the like.

SUMMARY

A vacuum cleaner is disclosed including a main body having an upper portion and a lower portion. A motor is disposed within the main body and is operable to generate a suction airflow from a suction opening to an air exhaust aperture. The suction opening is configured to receive airflow entering the vacuum cleaner. The main body includes a power cord operably connected to the motor. The power cord extends into the main body through a cord opening in the lower portion. A drain opening in the lower portion is configured for egress of liquid from the main body. The cord opening is higher than the drain opening when the main body is in a generally upright orientation.

In one embodiment a vacuum cleaner includes a main body having an upper portion including a top surface, a lower portion including a bottom surface, and a side wall between the top surface and the bottom surface. A motor is disposed within the main body and is operable to generate a suction airflow along an airflow passageway extending from a suction opening to an air exhaust aperture. The suction opening is configured to receive airflow entering the vacuum cleaner. A separator is disposed within the main body in fluid communication with the airflow passageway and the motor. A power cord is operably connected to the motor. The power cord extends into the main body through a cord opening in the lower portion. A drain opening in the lower portion is configured for egress of liquid from the main body. The cord opening is higher than the drain opening, inhibiting egress of liquid from the cord opening when the main body is in a generally upright orientation.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
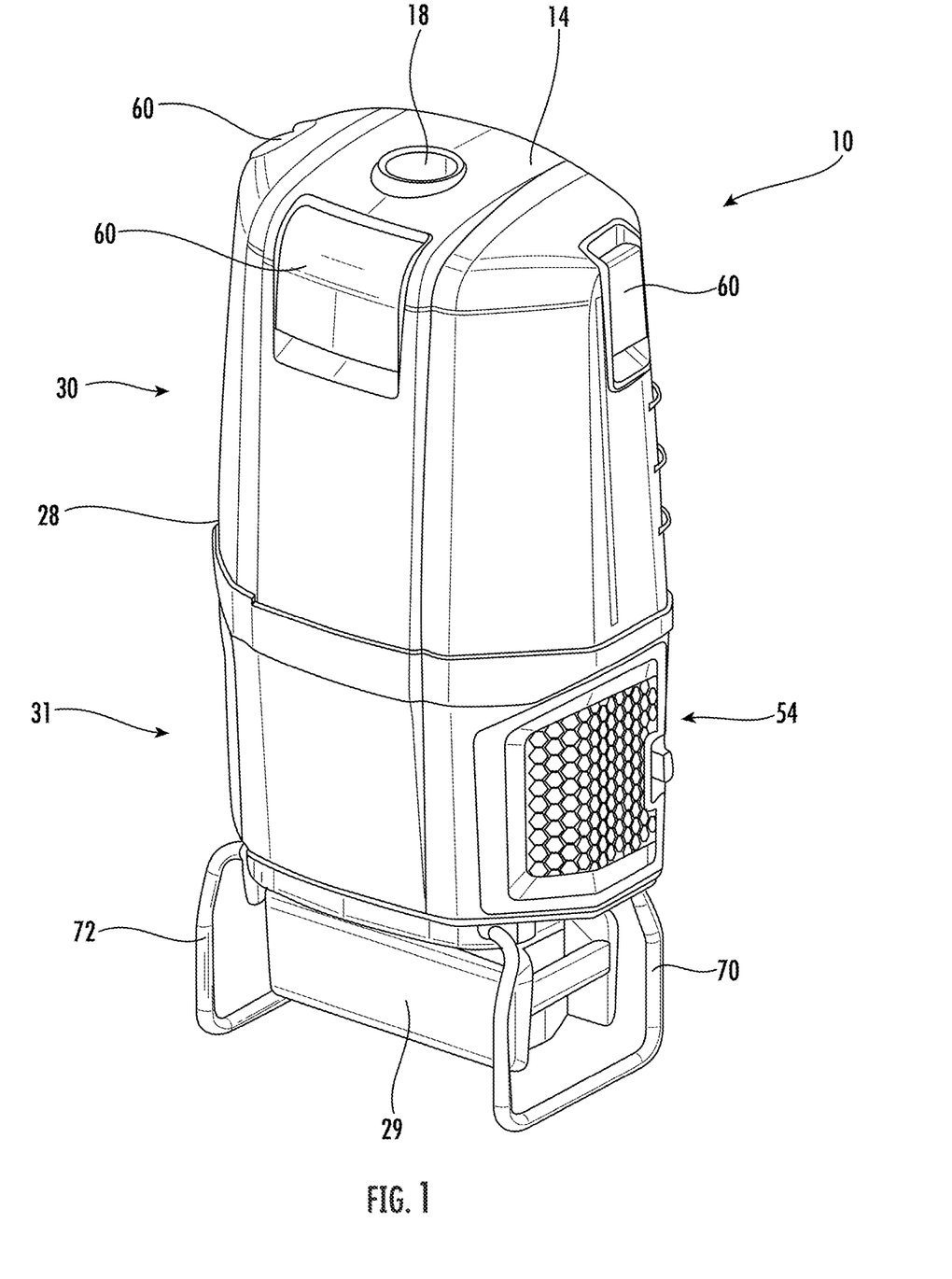
FIG. 1 is a perspective view of a vacuum cleaner according to one embodiment.

FIG. 1 illustrates a vacuum 10. The vacuum 10 includes a main body 28 having an upper portion 30 and a lower portion 31. In one embodiment, the vacuum 10 is powered by a battery 29 mounted beneath the lower portion 31 of the main body. The battery 29 is operatively connected to a motor 22 (shown in FIG. 2) by a power cord 44. The power cord 44 enters the lower portion 31 of the main body for connection to the motor through a cord opening 48.

While the vacuum 10 is intended for dry use, it is possible that liquid may inadvertently enter the vacuum 10. If liquid enters the main body 28, the vacuum 10 is configured to divert liquid by draining liquid from the main body 28 away from the battery 29 through a drain opening 50 in the lower portion 31 of the main housing. The drain opening 50 is positioned at a height lower than that of the cord opening 48 when the main body is in a generally upright orientation. Generally upright in the context of the present invention refers to the vacuum having the upper portion above the lower portion such as in an in-use position, or in a storage position. In the illustrated embodiment, the vacuum cleaner is a backpack vacuum, which has an in-use position along an operator's back. As shown in FIG. 1, the vacuum cleaner may rest on a surface in a storage position with the upper portion above the lower portion. In one embodiment, the location of the drain opening 50 allows egress of liquid from the main body before liquid entering the lower portion is able to reach the cord opening 48.

The upper portion 30 includes an upper housing 12 and a suction opening 18. In one embodiment, the upper housing 12 may include a debris separator 40 such as a filter bag 42. The upper portion 30 has a releasably coupled lid 14 for access to the debris separator 40 of the vacuum 10 so that a user can access the debris separator 40 or other components of the vacuum 10. The lid 14 is releasably coupled to the upper portion 30 so that the lid 14 is movable between a closed position and an open position. In the illustrated embodiment, the lid 14 is pivotally coupled to the upper portion 30 for movement between the open and closed positions. In the embodiment shown in FIG. 1, the lid 14 is secured to the upper portion 30 via one or more latches 60.

The lower portion 31 contains a motor 22, an air exhaust aperture 54, a power cord 44 operably connected to the motor 22, a cord opening 48, and a drain opening 50. In one embodiment, the lower portion includes a bottom wall 90 and a side wall 92. The side wall 92 extends between the upper housing 12 and the bottom wall 90. In one embodiment, the air exhaust aperture 54 is in the side wall 92. The air exhaust aperture 54 is in fluid communication with the motor such that suction airflow discharges from the vacuum 10 through the air exhaust aperture 54. In the illustrated embodiment, the air outlet aperture 54 includes a filter housing 57 in an air exhaust passageway 59. A post-motor filter 96 is operatively positioned in the filter housing 57 such that air exiting the air outlet aperture 54 passes through the post-motor filter 96.

The power cord 44 extends into the main body through the cord opening 48 in the lower portion 31. In the embodiment shown in FIGS. 2 and 3, the cord opening is incorporated into a raised offset surface 94 extending into the lower portion 31. The raised offset surface 94 and cord opening 48 are higher than the drain opening 50 when the main body is in a generally upright orientation, thus allowing egress of liquid from the lower portion 31 through the drain opening 50 before the liquid reaches the cord opening 48. For example, the distance between the drain opening 50 and the bottom wall 90 of the lower portion is less than the distance between the cord opening 48 and the bottom wall 90 of the lower portion. This allows any liquid that may accumulate on the bottom wall 90 of the lower portion to exit the vacuum 10 via the drain opening 50 before it reaches the height of the cord opening 48.

In one embodiment, the raised offset surface 94 and the cord opening 48 are located centrally in the lower portion 31. In the embodiment shown in FIG. 3, the raised offset surface 94 and the cord opening 48 are located toward one side of the lower portion 31, near the drain opening 50. In another embodiment, the raised offset surface 94 is connected to the side wall 92.

Figure 3:
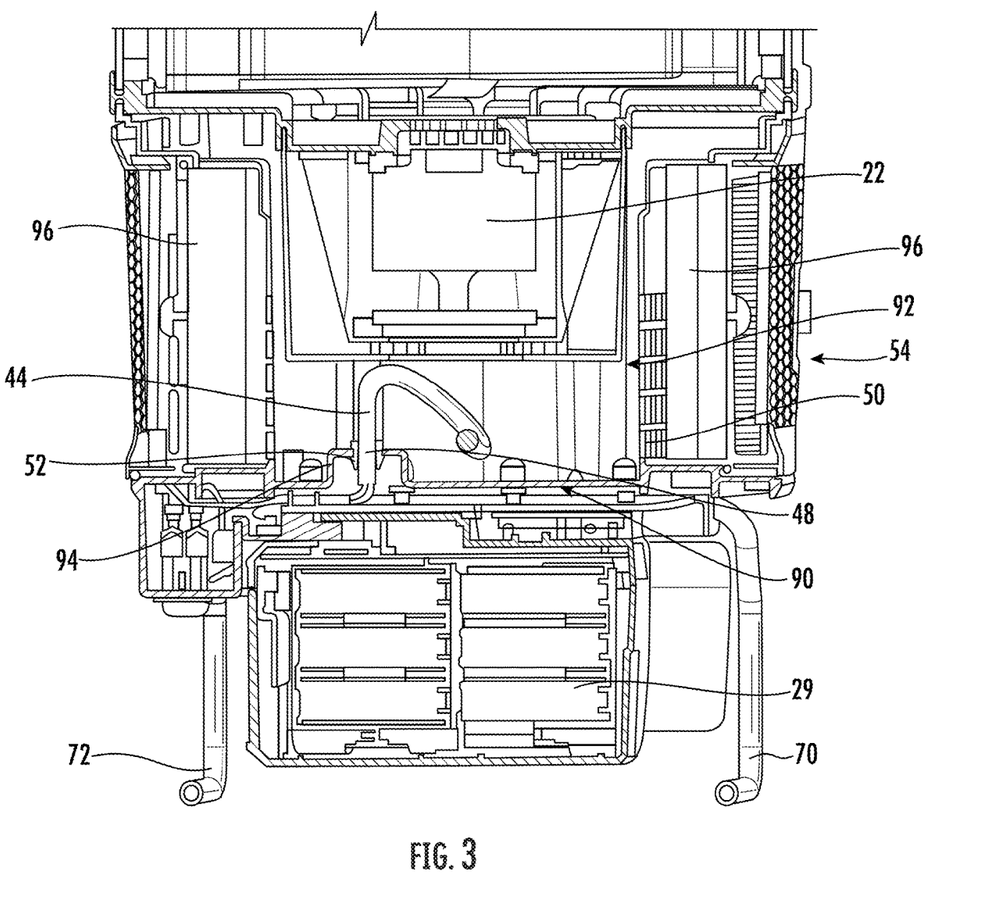
FIG. 3 is a partial cross-section view of the lower portion of the vacuum cleaner of FIG. 1.

In the illustrated embodiment, a grommet 52 is positioned in the cord opening 48 and the power cord 44 passes through the grommet 52. The grommet 52 provides an additional mechanism for inhibiting liquid from entering the cord opening 48. Thus, even if liquid were to reach the cord opening 48, the grommet 52 would help reduce or prevent the liquid from penetrating the cord opening 48 and reaching the battery 29. Additionally, by having the drain opening 50 lower than the cord opening 48 and grommet 52, liquid is less likely to reach the grommet 52.

Figure 4:
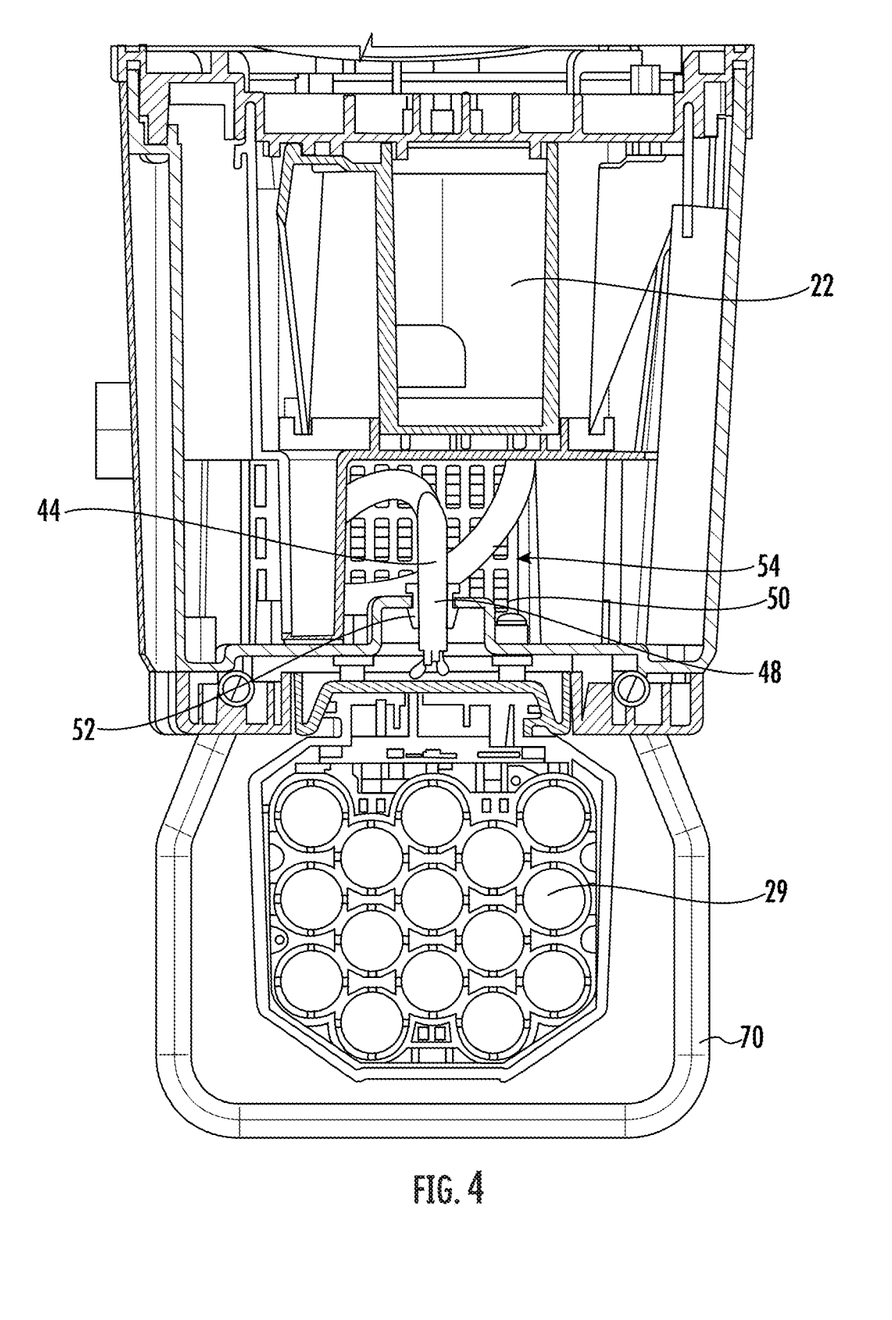
FIG. 4 is another partial cross-sectional view of the lower portion of the vacuum cleaner of FIG. 1.
Figure 5:
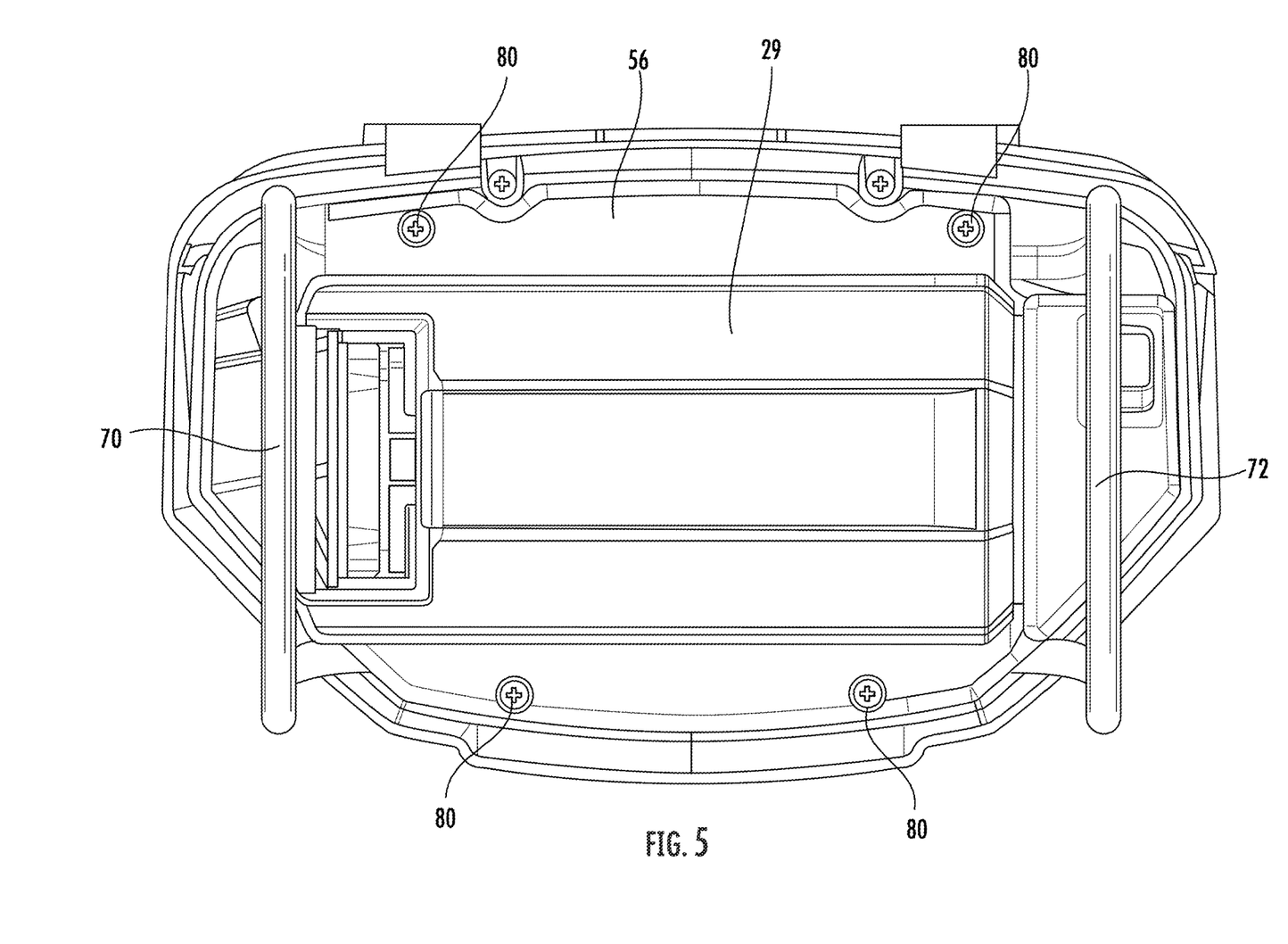
FIG. 5 is a bottom view of the vacuum cleaner of FIG. 1.

As shown in FIGS. 3 and 4, the drain opening 50 is incorporated into the air exhaust aperture 54 adjacent the air exhaust passageway 59 such that liquid passing from the main body through the drain opening 50 enters the exhaust passageway 59. The air exhaust passageway 59 is sloped toward the exterior of the main body such that liquid passing from the main body exits the drain opening 50, and flows by gravity along the air exhaust passageway 59. The liquid passes under the post-motor filter 96 and exits the vacuum 10 through the air exhaust aperture 54. In the illustrated embodiment, the drain opening 50 is configured such that liquid exits the main body away from the battery 29 or adjacent a periphery of the battery 29. The drain opening 50 is configured to divert the liquid away from the battery when the vacuum 10 is in a generally upright orientation.

In another embodiment, the drain opening 50 is independent of the air exhaust passageway 54. In one example, the bottom wall 90 or the side wall 92 of the lower portion has holes configured for draining liquids. In such an embodiment, the drain opening 50 is positioned and configured such that liquid exiting the main body 28 drains away from the battery 29 or adjacent a periphery of the battery 29. The drain opening 50 diverts liquid away from the battery 29 when the vacuum 10 is in a generally upright orientation.

In the illustrated embodiment, the motor 22 is a DC motor powered by a removable and rechargeable battery 29 located beneath the lower portion 31. In other embodiments, the motor can be powered by alternating current.

Referring to FIGS. 1-5, the battery 29 is surrounded by a frame 70, 72 formed from aluminum, steel, plastic, or other desired material. The frame may be a tubular frame, or may have another desired cross-sectional shape. The frame 70, 72 is removably attached to the lower portion 31 by means of screws, bolts, snap fits, clamps, interlocking fit, or other connections. In the embodiment shown in FIG. 5, the frame 70, 72 is clamped by a cover 56 secured to the lower portion 31. In the embodiment shown in FIG. 5, the cover 56 is secured with one or more screws 80. In other embodiments, the cover 56 may be secured to the lower portion 31 of the main body by screws, latches, quarter turn fasteners, interlocking fit, or other connection. As shown in FIG. 1, the frame 70, 72 has a support member configured to support the vacuum cleaner 10 on a surface. The frame 70, 72 may be configured to be energy-absorbing to protect the vacuum cleaner 10, especially the battery 29, in the event of a drop. In this context, energy-absorbing generally means the ability to absorb kinetic energy associated with a drop of the vacuum 10, and transform said kinetic energy into deformation work to prevent the frame 70, 72, battery 29, and/or vacuum 10 from being permanently damaged. In one embodiment, the frame is configured to resiliently deform as a spring to absorb energy. In another embodiment, the frame is configured to bend or fold to absorb energy. In the illustrated embodiment, the frame 70, 72 is two pieces, separately attached to the lower portion 31. The frame 70, 72 is removable and replaceable such as if the frame 70, 72 were damaged when the vacuum 10 is dropped.

Figure 2:
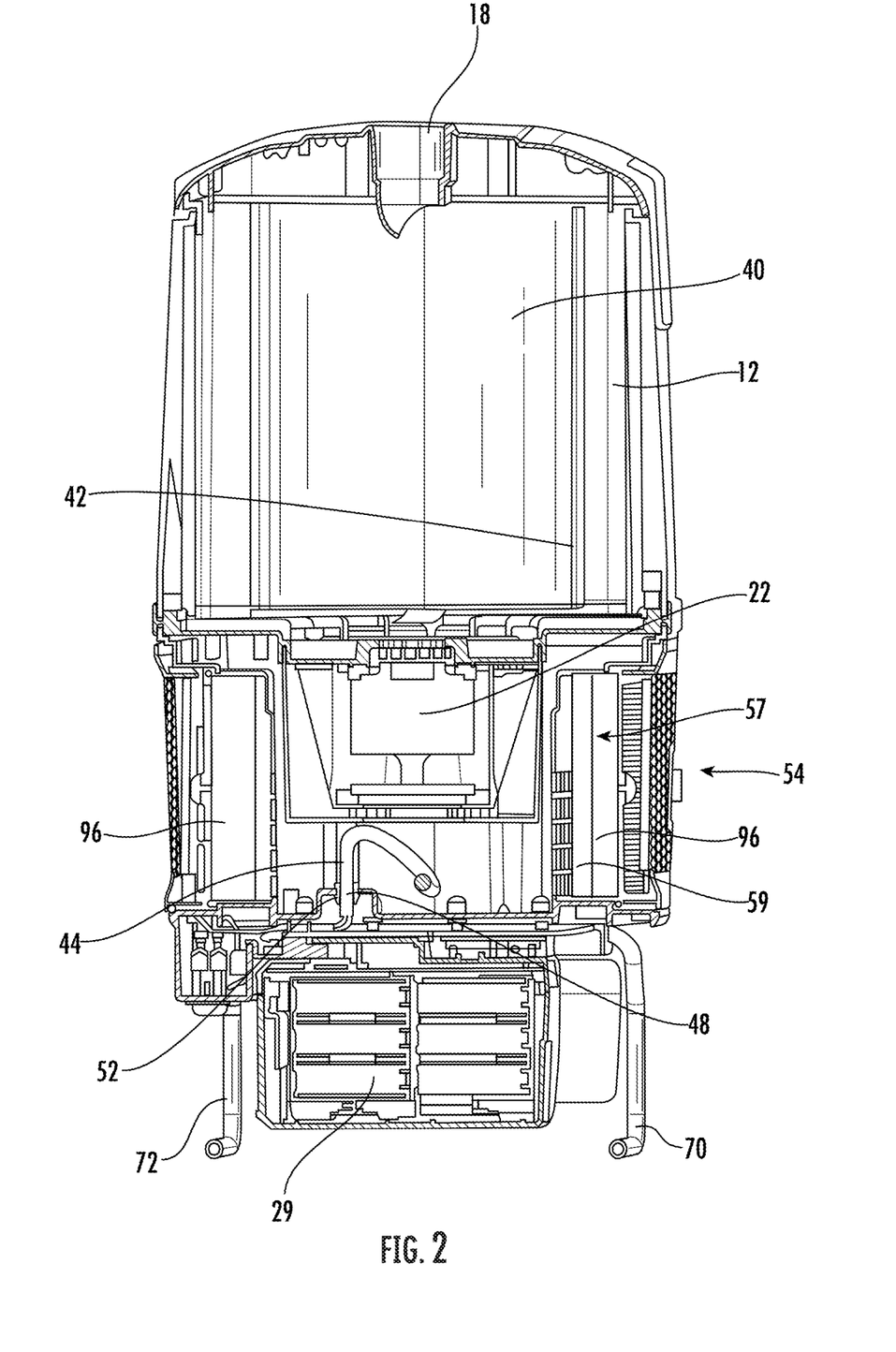
FIG. 2 is a cross-sectional view of the vacuum cleaner of FIG. 1.

Referring to FIG. 2, the vacuum 10 further includes a debris separator 40 located within the upper housing 12. In the embodiment illustrated in FIG. 2, the debris separator 40 is a filter bag 42. In other embodiments, the debris separator 40 can include a cyclonic separator. In other alternatives, the debris separator may be a pleated filter or other type of filter and the like. The debris separator 40 receives suction airflow from the suction opening 18. For a debris separator 40 including a filter bag such as illustrated in FIG. 2, airflow travels into and through the filter 42 such that debris is separated from the suction airflow and the debris remains within the filter 42 while the clean airflow travels through the filter 42.

Various features and advantages of the invention are set forth in the following claims.

What is claimed is:

1. A vacuum cleaner comprising:
a main body having an upper portion and a lower portion, the lower portion defining an air exhaust aperture,
a suction opening,
a motor disposed within the main body operable to generate a suction airflow along an airflow path from the suction opening to the air exhaust aperture,
a power cord operably connected to the motor, the power cord extending into the main body through a cord opening in the lower portion, the cord opening in the airflow path, and a portion of the power cord in the airflow path, and
a drain opening in the lower portion configured for egress of liquid from the main body along the airflow path, the cord opening being higher than the drain opening when the main body is in a generally upright orientation, wherein the drain opening is incorporated into the air exhaust aperture.

2. The vacuum cleaner of claim 1 wherein the lower portion includes a bottom wall and a side wall, wherein the bottom wall includes a raised offset surface extending into the lower portion higher than the drain opening when the main body is in a generally upright orientation, wherein the cord opening is through the raised offset surface.

3. The vacuum cleaner of claim 2 wherein the air exhaust aperture is in the side wall.

4. The vacuum cleaner of claim 1 wherein the lower portion includes a bottom wall and a side wall, and wherein the air exhaust aperture is in the side wall.

5. The vacuum cleaner of claim 1 further comprising a battery mounted beneath the lower portion of the main body, where the drain opening is positioned such that liquid exits the main body adjacent a periphery of the battery when the main body is in a generally upright orientation.

6. The vacuum cleaner of claim 1 further comprising a grommet positioned in the cord opening, where the power cord passes through the grommet.

7. The vacuum cleaner of claim 1 further comprising a separator disposed within the main body in fluid communication with the airflow path and the motor, the drain opening downstream of the separator, and the cord opening downstream of the separator.

8. The vacuum cleaner of claim 7 wherein the motor, the cord opening and the drain opening are in the lower portion of the main body and the separator is in the upper portion of the main body.

9. A vacuum cleaner comprising:
a main body having an upper portion and a lower portion, the lower portion defining an air exhaust aperture,
a suction opening,
a motor disposed within the main body operable to generate a suction airflow along an airflow path from the suction opening to the air exhaust aperture,
a power cord operably connected to the motor, the power cord extending into the main body through a cord opening in the lower portion, the cord opening in the airflow path, and a portion of the power cord in the airflow path,
a drain opening in the lower portion configured for egress of liquid from the main body along the airflow path, the cord opening being higher than the drain opening when the main body is in a generally upright orientation, and
a frame attached to the lower portion of the main body surrounding at least a portion of a battery, wherein the frame extends beneath the lower portion when the main body is in a generally upright orientation forming a support member configured to support the vacuum cleaner on a surface.

10. The vacuum cleaner of claim 9 wherein the drain opening is incorporated into the air exhaust aperture.

11. The vacuum cleaner of claim 9 wherein the frame is removable.

12. The vacuum cleaner of claim 9 wherein the frame includes two separate pieces.

13. A vacuum cleaner comprising:
a main body having an upper portion including a top surface, a lower portion including a bottom surface, and a side wall between the top surface and the bottom surface,
a motor disposed within the lower portion of the main body operable to generate a suction airflow along an airflow passageway extending from a suction opening to an air exhaust aperture,
a separator disposed within the upper portion of the main body in fluid communication with the airflow passageway and the motor, the motor downstream of the separator,
a power cord operably connected to the motor, the power cord extending into the main body through a cord opening in the lower portion, the cord opening downstream of the separator,
a drain opening in the lower portion configured for egress of liquid from the main body, the cord opening being higher than the drain opening inhibiting egress of liquid through the cord opening when the main body is in a generally upright orientation, the drain opening downstream of the separator.

14. The vacuum cleaner of claim 13 wherein the cord opening and the drain opening are in the airflow passageway.

15. The vacuum cleaner of claim 13 wherein the cord opening and the drain opening are in the lower portion of the main body.

16. A vacuum cleaner comprising:
a main body having an upper portion including a top surface, a lower portion including a bottom surface, and a side wall between the top surface and the bottom surface,
a motor disposed within the main body operable to generate a suction airflow along an airflow passageway extending from a suction opening to an air exhaust aperture,
a separator disposed within the main body in fluid communication with the airflow passageway and the motor, the motor downstream of the separator,
a power cord operably connected to the motor, the power cord extending into the main body through a cord opening in the lower portion, the cord opening downstream of the separator,
a drain opening in the lower portion configured for egress of liquid from the main body, the cord opening being higher than the drain opening inhibiting egress of liquid through the cord opening when the main body is in a generally upright orientation, the drain opening downstream of the separator,
wherein the drain opening is incorporated into the air exhaust aperture.

17. The vacuum cleaner of claim 16 wherein the bottom wall includes a raised offset surface extending into the lower portion higher than the drain opening when the main body is in a generally upright orientation, wherein the cord opening is through the raised offset surface.

18. The vacuum cleaner of claim 17 wherein the air exhaust aperture is in the side wall.

19. The vacuum cleaner of claim 16 further comprising a grommet positioned in the cord opening, where the power cord passes through the grommet.

20. The vacuum cleaner of claim 16 further comprising a battery mounted beneath the lower portion of the main body, where the drain opening is positioned such that liquid exits the main body adjacent a periphery of the battery when the main body is in a generally upright orientation.

21. The vacuum cleaner of claim 16 further comprising a tubular frame attached to the lower portion of the main body surrounding at least a portion of the battery, wherein the tubular frame extends beneath the lower portion when the main body is in a generally upright orientation forming a support member configured to support the vacuum cleaner on a surface.

22. The vacuum cleaner of claim 21 wherein the tubular frame is removable.

23. The vacuum cleaner of claim 21 wherein the tubular frame includes two separate pieces.

24. The vacuum cleaner of claim 16 wherein the separator is in the upper portion of the main body and the motor is in the lower portion of the main body.

25. The vacuum cleaner of claim 24 further comprising a battery, wherein the power cord operably couples the battery and the motor, wherein the battery is adjacent a first side of the lower portion of the housing and the separator is adjacent a second side of the lower portion of the housing opposite the first side.

26. The vacuum cleaner of claim 25 wherein the motor is between the separator and the battery.

27. A vacuum cleaner comprising:
a main body having an upper portion and a lower portion, the lower portion defining an air exhaust aperture,
a suction opening,
a debris separator, the suction opening and the debris separator located in the upper portion,
a motor disposed within the lower portion of the main body operable to generate a suction airflow along an airflow path from the suction opening to the air exhaust aperture,
a power cord operably connected to the motor, the power cord extending into the main body through a cord opening in the lower portion, the cord opening in the airflow path, and a portion of the power cord in the airflow path, and
a drain opening in the lower portion configured for egress of liquid from the main body through the air exhaust aperture along the airflow path, the cord opening being higher than the drain opening when the main body is in a generally upright orientation.

* * * * *